United States Patent [19]

Cunningham et al.

[11] Patent Number: 5,287,235
[45] Date of Patent: Feb. 15, 1994

[54] SLIDER AIR BEARING SURFACE WITH ANGLED RAIL CONFIGURATION

[75] Inventors: Earl A. Cunningham; Richard F. Harwood, both of Rochester, Minn.

[73] Assignee: International Business Machines Corporation, Armonk, N.Y.

[21] Appl. No.: 783,477

[22] Filed: Oct. 28, 1991

[51] Int. Cl.$^5$ .................. C11B 5/60; C11B 15/64; C11B 17/32
[52] U.S. Cl. .................................................. 360/103
[58] Field of Search ........................................ 360/103

[56] References Cited

U.S. PATENT DOCUMENTS

| | | | |
|---|---|---|---|
| 3,823,416 | 7/1974 | Werner | 360/103 |
| 3,855,625 | 12/1974 | Garnier et al. | 360/103 |
| 4,218,715 | 8/1980 | Garnier | 360/103 |
| 4,375,656 | 3/1983 | Radman, Jr. et al. | 360/102 |
| 4,652,959 | 3/1987 | Hamada | 360/130.3 |
| 4,700,248 | 10/1987 | Coughlin et al. | 360/103 |
| 4,734,803 | 3/1988 | Nishihira | 360/103 |
| 4,870,519 | 9/1989 | White | 360/103 |
| 5,086,360 | 2/1992 | Smith et al. | 360/103 |
| 5,097,370 | 3/1992 | Hsia | 360/103 |
| 5,136,445 | 8/1992 | Zak | 360/103 |

FOREIGN PATENT DOCUMENTS

| | | | |
|---|---|---|---|
| 3-12854 | 1/1991 | Japan | 360/103 |
| 3-76070 | 4/1991 | Japan | 360/103 |
| 4-67375 | 3/1992 | Japan | 360/103 |

Primary Examiner—Edward P. Westin
Assistant Examiner—Benjamin D. Driscoll
Attorney, Agent, or Firm—Richard E. Billion; Roy W. Truelson

[57] ABSTRACT

Disclosed is a slider with an air bearing surface for flying a magnetic transducer on an air lubrication film over a moving recording medium. The air bearing surface allows the slider to fly at a close and substantially uniform height over the disk surface regardless of the skew angle of the air flow. The slider has a pair of nonidentical, nonsymmetrical rails disposed about the longitudinal axis of the slider, which through the viscous effects of the air flow, provide the air lubrication film when the recording medium is in motion.

41 Claims, 11 Drawing Sheets

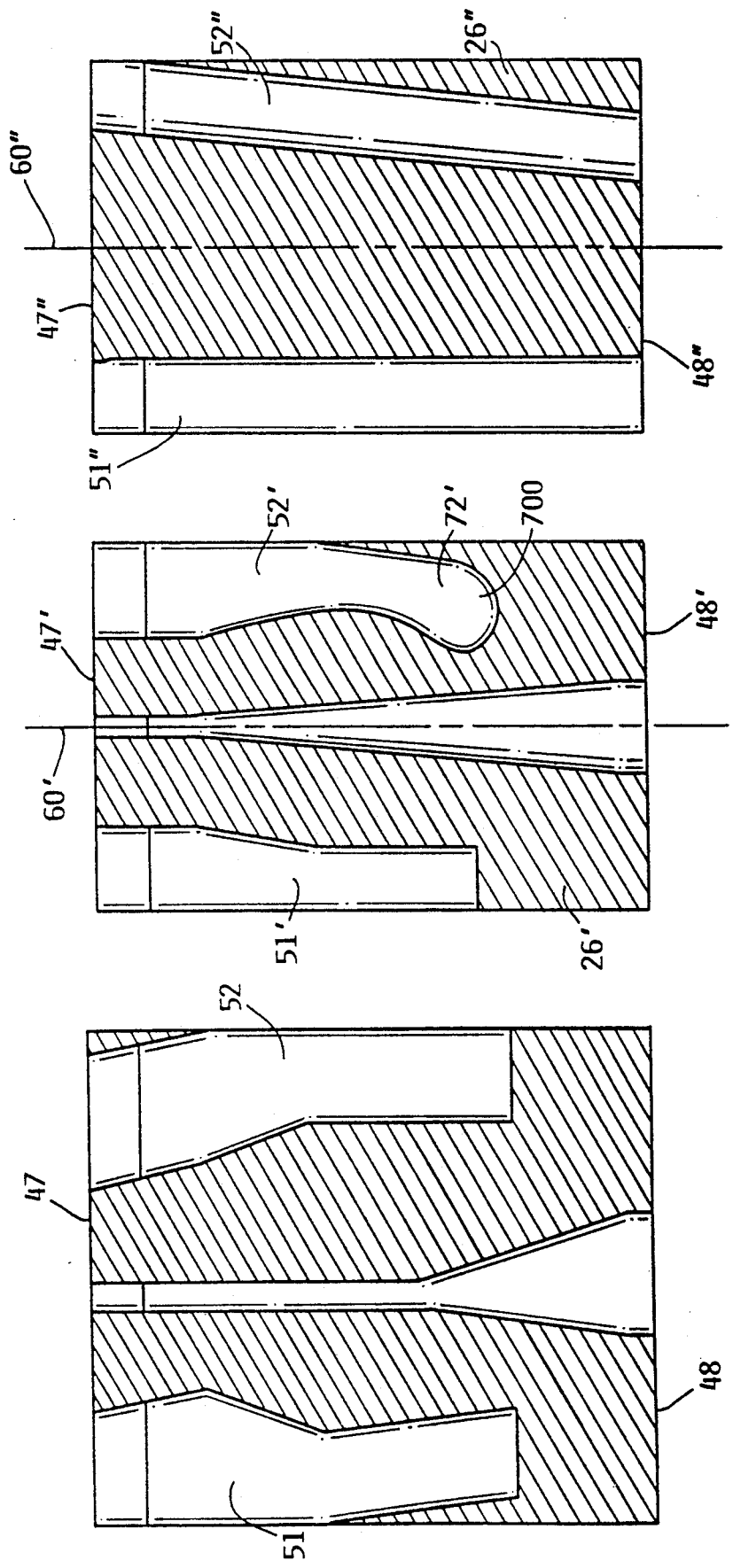

SLIDER AIR BEARING SURFACE WITH ANGLED RAIL CONFIGURATION

FIELD OF THE INVENTION

The present invention pertains to the field of disk drives, which are also called direct access storage devices (DASD). Specifically, this invention pertains to an apparatus for stabilizing the flying height and roll of a slider.

BACKGROUND OF THE INVENTION

Computer systems employ a number of storage means to store data. One of these storage means is a disk drive, which is also called a direct access storage device (DASD). A disk drive includes several disks that look similar to 45 RPM records used on a record player or compact disks used in a CD player. The disks are stacked on a spindle, much like several 45 RPM records awaiting to be played. In a disk drive, however, the disks are mounted on the spindle and spaced apart so that the separate disks do not touch each other.

The surface of each disk is uniform in appearance. Nevertheless, in actuality, each of the surfaces is divided into portions, called tracks, where data is stored. These tracks are arranged in concentric circles like rings in a tree. Compact disks have tracks as do the disks in a disk drive. The tracks in either the disk drive or the compact disk essentially replace the grooves in a 45 RPM record. Each track in a disk drive is further subdivided into sectors, which are just sections of one of the concentric tracks.

Disk are made of a variety of materials, such as metal, plastic, or glass. In a plastic disk, such as those used as CD's, a laser stores and retrieves the data. In a metal disk, an electrical magnet, commonly known as a transducer, stores and retrieves the data.

In order to store data on a magnetic disk, the disk surface is magnetized using a small ceramic block, commonly called a slider, that contains a magnetic transducer, called a write head. More specifically, the slider containing the write head is flown at a height of a few millionths of an inch from the disk surface, and the head is energized to various states causing the track below to be magnetized to represent the data.

To retrieve data stored on a magnetic disk, the slider containing a read head is flown over the disk. This time the magnetized portions of the track induce a current in the read head. By analyzing the current output from the read head, the computer system can reconstruct and use the data stored on the magnetic disk. Although some disk drives use a separate read and write head, most current disk drives use a transducer that acts as both the read and write head.

Like a record, both sides of a disk are generally used to store data or other information necessary for the operation of the disk drive. Since the disks are held in a stack and are spaced apart from one another, both the top and the bottom surface of each disk in the stack of disks have their own read and write heads. This is analogous to a stereo that could play both sides of a record at the same time, each side having its own stylus.

There are two types of disk drives, those with rotary actuators and those with linear actuators. Rotary actuators have an actuator arm, which is analogous to a record player tone arm. Like a tone arm, the actuator arm rotates so that the slider containing the read and write heads is moved to locations over various tracks on the disk. In this way, the read and write heads can be used to magnetize a track on the surface of the disk in a pattern representing the data or used to detect the magnetized pattern on a track. For example, the needed data may be stored on two different tracks on one particular disk, so to read the magnetic representations of data, the actuator arm is rotated from one track to another track. This invention is concerned with rotary actuator disk drives.

A linear actuator has a similar actuator arm, however, repositioning is accomplished through linear instead of rotational movement.

The actuator arm of a disk drive has a slider affixed at the end, which holds the read and write heads. Also affixed to the slider are rails. When the disk rotates, air is dragged between the rails and the disk surface causing pressure, which forces the head away from the disk. The head is thus said to fly over the rotating disk. The fly height is the thickness of the air lubrication film, i.e., the distance between the disk surface and the head.

Thus, a rail is an air bearing surface (ABS) that forms and maintains a self-pressurizing air lubrication film between the head and the disk recording surface. This film eliminates the friction and resulting wear that would occur if the head and disk were in mechanical contact during disk rotation.

Previous ABS designs consisted primarily of a two-rail tapered configuration known as taper-flat sliders. The two-rail taper-flat configurations typically had two or more flat rails each having a tapered forward edge. The rails were elongated and the tapered edge faced toward the direction of rotation of the disk surface. These designs worked well in linear actuator disk drives when the flow of air between the disk and the slider was primarily uni-directional along the length of the rails. In other words, these designs worked well when the slider was positioned with respect to the disk such that the flow of air was viscously dragged under the slider from the front of the slider to the back along a longitudinal axis parallel to the rails. The taper-flat design concept dates back to large diameter file designs having relatively low access rates which use linear actuators.

Today's disk drive files are much different from the large diameter disk drives which used linear actuators. Current files are much smaller and feature high-speed access of data. Currently, disk drives have disks with 5.25", 3.50", 2.50" or 1.80" diameters and feature rotary actuators to achieve high-speed access rates. Mainly due to the use of rotary actuators, the air flow under the slider is no longer substantially uni-directional, but varies widely in angle with respect to the longitudinal axis of the slider. In addition, high speed seek motion of the actuator during accessing causes angular flow between the head and disk. Therefore, in modern rotary actuator disk drives, the flow of air can no longer be considered as moving from the front to the back of the slider, or even at small deviations from front to back.

The angle of the air flow with respect to the longitudinal axis of the slider is called the skew angle. If the actuator arm is positioned such that the air flow strikes the outside, or rim, edge of the slider, then the skew angle is said to be positive. If the actuator arm is positioned such that the air flow strikes the inside, or hub, edge of the slider, then the skew angle is said to be negative. The taper-flat design is susceptible to a severe reduction of fly height at high positive or negative skew angles and large access speeds because the taper-flat slider was designed for linear actuators rather than for rotary actuators.

Also, the skew angle of the air flow can cause the slider to roll such that the flying height is not uniform under all the rails. Roll of a slider is analogous to the roll of an airplane when it banks into a turn; one wing goes up while the other wing goes down. In a disk drive, a positive roll occurs when the rim rail rolls away from the disk surface, while a negative roll occurs when the rim rail rolls toward the disk surface.

The fly height of a slider in a disk drive is a critical parameter that must be controlled. An increase in fly height can cause a decrease in signal amplitude and a decrease in the signal to noise ratio, thus increasing the error rate. A degradation in fly height can increase the likelihood that the head will come into contact with the disk surface, causing accelerated wear on both the head and disk surfaces, causing reduced reliability, and even causing failure of the disk drive. A severe contact with the disk surface which causes a failure is called a crash and results in the inability to recover data.

Control of the roll of the slider is also important. When roll lowers a corner of the slider, the likelihood is increased that the head will come into contact with the disk surface. Roll that raises one corner of the slider can increase the distance of the read and write heads from the disk surface, causing data errors in the same manner that increasing the fly height of the slider causes data errors. This effect of roll is exacerbated in sliders where the read and write heads are mounted on the corner of the slider that is raised.

A recent patent that allegedly lessens the problems caused by skew angle and roll is U.S. Pat. No. 4,870,519 issued to White on Sep. 26, 1989. White modified the basic taper-flat slider design by adding a longitudinal step to the slider edge. The White invention has numerous disadvantages, including additional manufacturing processes to make the steps. The steps also introduce additional fly height sensitivities, and the steps provide the potential of contamination from debris accumulation.

The present invention is a different solution to the same problems of degraded fly height without the disadvantages of the White patent. The present invention has no stepped or convex edges, so it avoids additional processes, fly height sensitivities, and the potential for contamination from debris accumulation. The present invention also can be manufactured with a single etching mask operation, while the stepped or convex edges of White would require multiple mask operations. It would also be possible to form the slider by other methods such as by grinding the slider.

SUMMARY OF THE INVENTION

In the present invention, an air bearing surface of a disk drive slider, which also holds a magnetic transducer (read and write head), contains rails that are non-symmetrical about the longitudinal axis of the slider. Each air bearing rail is tapered at its forward edge so as to pressurize incoming air flow to produce an air lubrication film between the slider and the disk surface. At least one of the rails or a portion of at least one of the rails is placed at an angle with respect to the longitudinal axis of the slider so that different portions of the air bearing surface are pressurized in varying amounts at differing skew angles, thus minimizing fly height and roll variations as the slider moves from the inner diameter (ID) to the outer diameter (OD) of the disk drive.

Minimizing fly height and roll variations decreases the likelihood that the transducer will come into contact with the disk surface, reduces wear on both the head and disk surfaces, increases reliability, and lessens chances for a crash or disk drive failure.

It is an object of this invention to provide an improved air bearing surface design that results in less sensitivity of the fly height resulting from high skew angles and high speed access rates.

It is a further object of this invention to provide a nonsymmetrical slider design that can be optimized to achieve minimum changes in fly height from ID to OD.

It is a further object of this invention to provide a slider whose air bearing surface area is placed so that different portions of the air bearing surface are pressurized in varying amounts at differing skew angles, thus minimizing the fly height and roll variations.

It is an further object of this invention to provide a slider whose rails are primarily at low skew angles during start/stop at the landing zone, thus decreasing the take-off velocity and improving durability.

It is an further object of this invention to provide a slider whose rails are placed at an angle on the ABS, so that the skew angle of the rails with respect to the disk is optimized, even when the actuator placement is such that this angle could not be obtained by an inline mounting of the slider on the suspension.

BRIEF DESCRIPTION OF THE DRAWINGS

For a better understanding of the present invention, reference can be made to the accompanying drawings, in which:

FIG. 12 is a second embodiment of the invention using two bent rails.

FIG. 13 is a third embodiment of the invention using curved boundaries on the relief regions.

FIG. 14 is a fourth embodiment of the invention using a straight rail configuration.

These drawings are not intended as a definition of the invention but are provided solely for the purpose of illustrating the embodiments of the invention described below.

DETAILED DESCRIPTION OF THE PREFERRED EMBODIMENT

The invention described in this application is useful with all mechanical configurations of disk drives or direct access storage devices (DASD) having rotary actuators.

Figure 1:
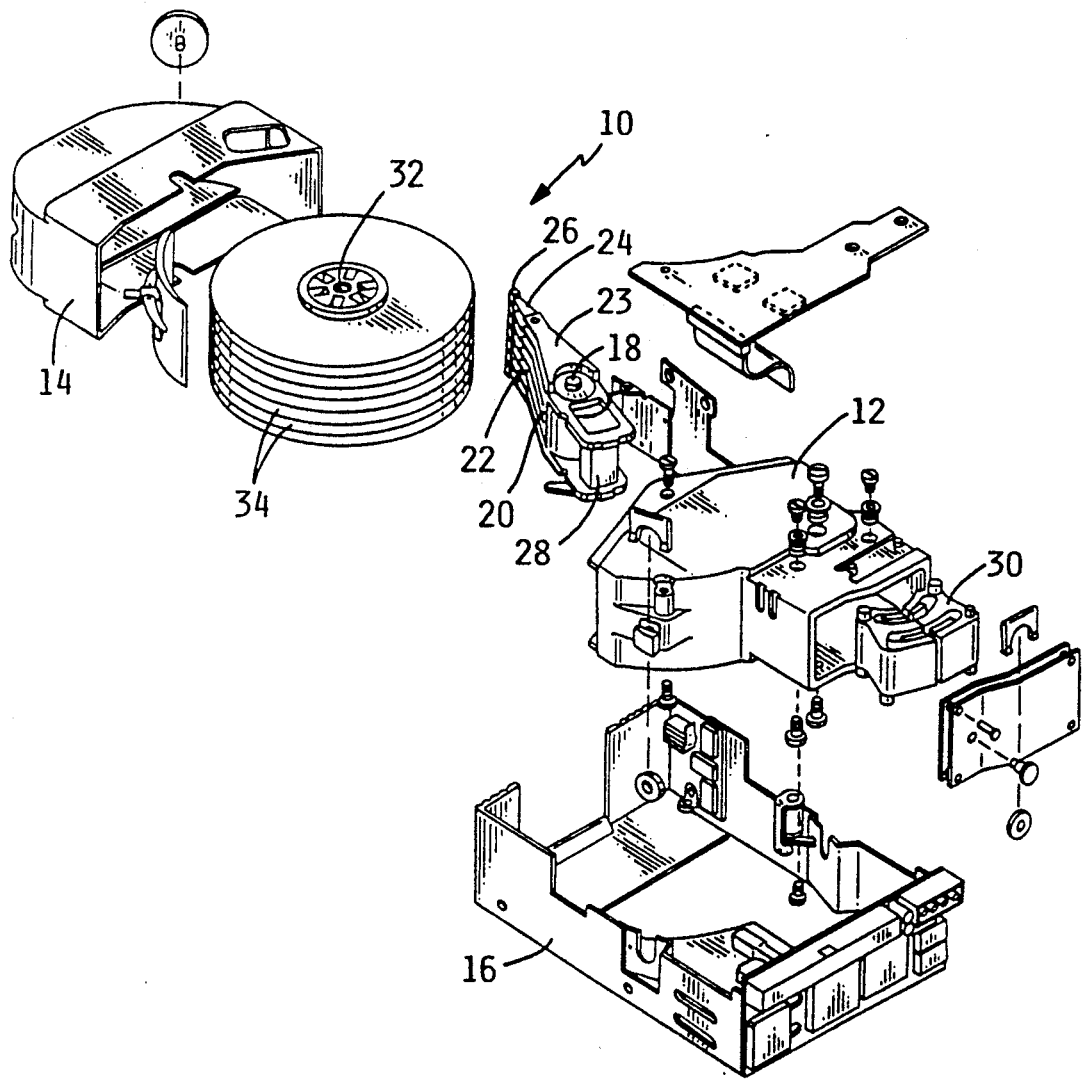
FIG. 1 is an exploded view of a disk drive.

FIG. 1 is an exploded view of a disk drive 10. The disk drive 10 includes a housing 12, and a housing cover 14 which, after assembly, is mounted within a frame 16. Rotatably attached within the housing 12 on an actuator shaft 18 is an actuator arm assembly 20. One end of the actuator arm assembly 20 includes an E block or comb like structure 22 having a plurality of arms 23. Attached to the separate arms 23 on the comb or E block 22, are load springs 24. Attached at the end of each load spring 20 is a slider 26 which carries a magnetic transducer or read and write head (not shown in FIG. 1).

Mounted within the housing 12 is a spindle shaft 32. Rotatably attached to the spindle shaft 32 are a number of disks 34. In FIG. 1, eight disks are attached to the spindle shaft 32 in spaced apart relation. The disks 34 rotate on spindle shaft 32 which is powered by a motor (not shown). Information is written on or read from the disks 34 by means of heads or magnetic transducers (not shown) which are within sliders 26 and which are positioned by the actuator arm assembly 20.

Each of the arms 23 of the E block 22, except for the top and bottom arm, carry two load springs. In this particular disk drive 10, there is a slider 26 for both the top and bottom surface of each of the disks 34. The top and bottom arms 23 of the E block 22 have only one load spring 24 since these are used for the top surface of the top disk and the bottom surface of the bottom disk in the stack of disks 34. A motor comprised of coil 28 and pole magnet assembly 30, is used to apply a force to the actuator assembly 20 and rotate the actuator assembly 20 about the actuator shaft 18.

Figure 2:
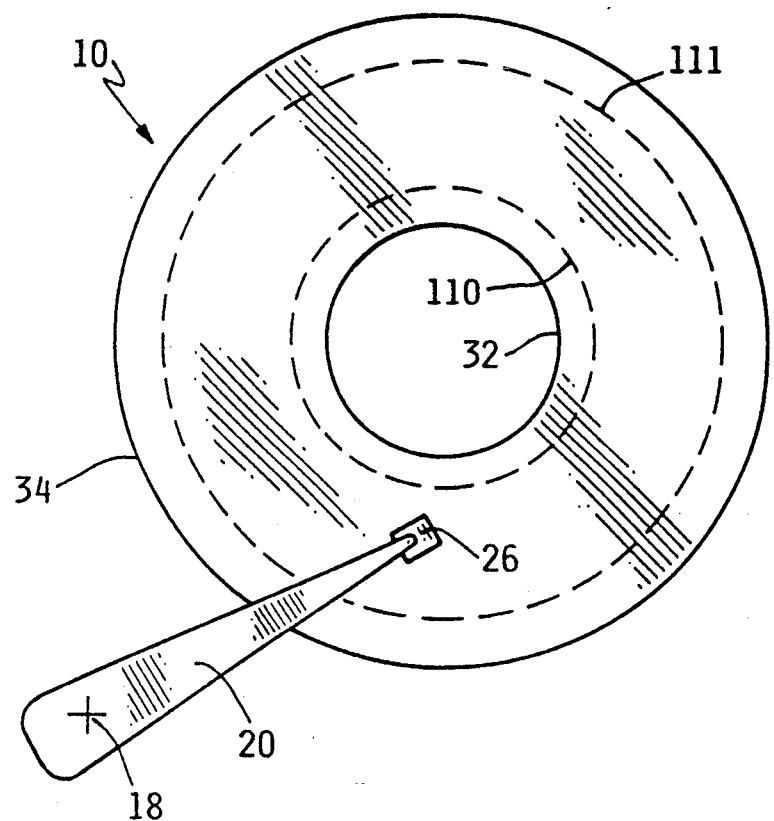
FIG. 2 is a top view of a slider and disk drive surface.

FIG. 2 details the top view of one of the disks 34. As is well known in the art of disk drives, each of the disks has a series of concentric tracks onto which the magnetic information is recorded. The inner diameter (ID) 110 is the innermost concentric track on which data may be stored. The outer diameter (OD) 111 is the outermost concentric track on which data may be stored. The sliders 26 and the magnetic transducers (not shown) incorporated therein are moved over the surface of a particular disk 34 so that a magnetic representation of data can be stored in any of the tracks on the disk 34. In disk drive 10, the transducer movement is rotational and about the actuator shaft 18. Rotating the actuator arm assembly 20 causes the slider 26 and the transducer therein to be repositioned over any track on the surface of the disk 34.

Figure 3:
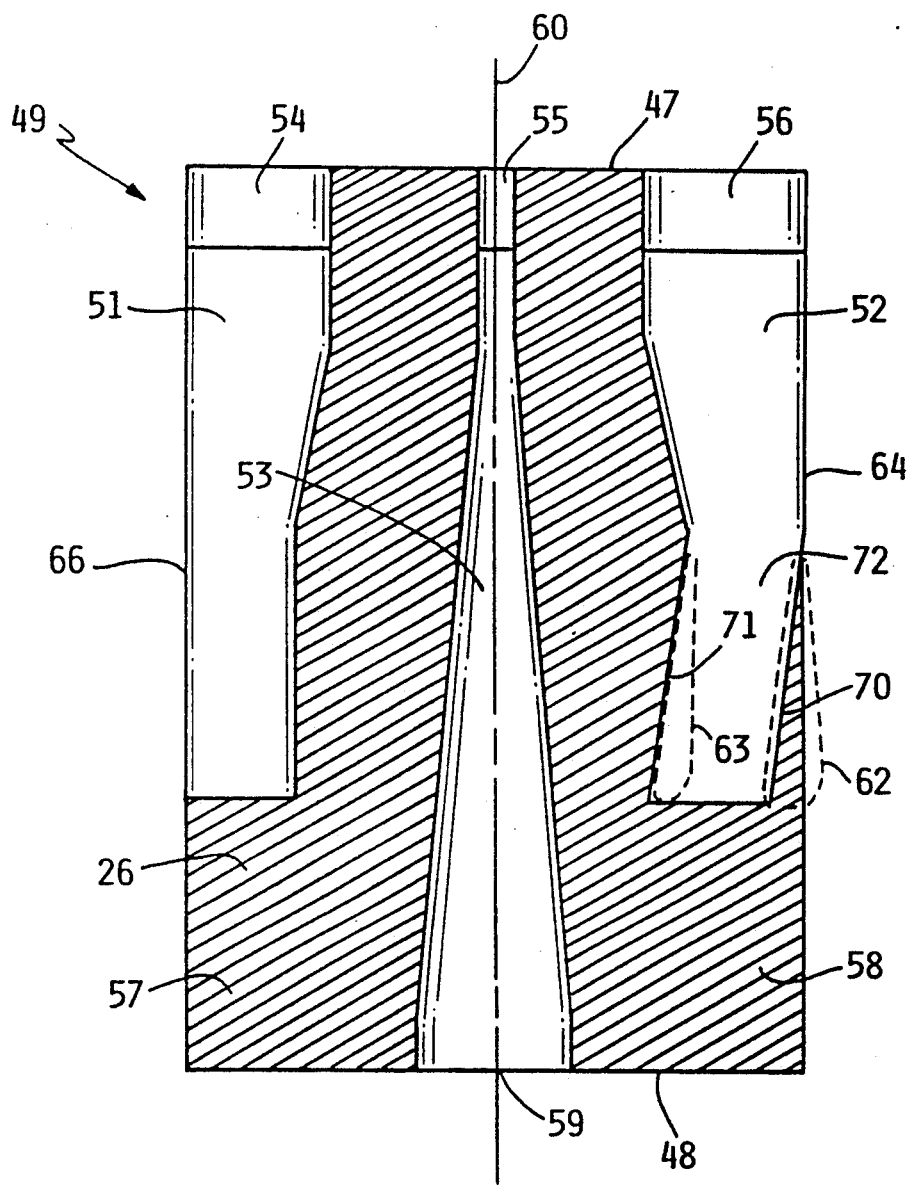
FIG. 3 is the preferred embodiment of the present invention; shown is the configuration of the air bearing surface that faces the disk surface.

FIG. 3 illustrates the preferred embodiment of the slider 26 and shows the air bearing surface (ABS) 49 configuration that is affixed to the underside of slider 26 and faces the disk surface. The ABS configuration 49 may be formed by molding, etching, laser ablation, ion milling, conventional machining processes, or by a variety of other means.

The slider 26 includes a leading edge 47, a trailing edge 48, a rim edge 64, and a hub edge 66. As presented in FIG. 3, the slider 26 includes a hub rail 51, a center rail 53, and a rim rail 52. Also shown are tapered portions 54, 55, and 56 of the rails, which are located on the leading edge 97 of the slider and face toward the direction of rotation of the disk surface. The rotating disk forces air by viscous effects into the tapers 54, 55, and 56, thereby producing pressure beneath each of the rails, resulting in the air lubrication film. The relief areas 57 and 58 are of sufficient depth so that no lift forces are generated by air lubrication film effects. The recording transducer or read and write head would typically be located at the trailing edge of the center rail at 59.

For purposes of illustration, FIG. 3 also includes a longitudinal axis 60. The angle of the air flow with respect to the longitudinal axis 60 of slider 26 is called the skew angle, and may vary widely from ID 110 to OD 111, and depends on the placement of the arm assembly 20 on the rotary actuator shaft 18. The skew angle may be positive or negative. If the actuator assembly 20 is positioned such that the air flow strikes the rim edge 64 of the slider 26, the skew angle is said to be positive. If the actuator arm is positioned such that the air flow strikes the hub edge 66 of the slider 26, the skew angle is said to be negative. In the preferred embodiment, the rotary actuator arm assembly 20 is placed such that a high positive skew occurs at OD 111 and a low positive skew occurs at ID 110. The skew angle of the air flow causes the slider to roll such that the flying height is not uniform under all the rails. A positive roll occurs when the rim rail 52 rolls up away from the disk surface, while a negative roll occurs when the rim rail 52 rolls down toward the disk surface. In the preferred embodiment, positive roll tends to occur as the slider moves toward ID 110, while negative roll tends to occur as the slider moves toward OD 111.

As slider 26 flies over the surface of disk 34 from ID 110 to OD 111 of a rotary actuator disk drive, the configuration of the rails 51, 52 and 53 determines the shape of the lubricating air film pressure distribution. Still referring to FIG. 3, the rail configuration is designed to produce a pressure distribution such that the fly height and roll changes are minimized with respect to the skew angle. The rim rail 52 includes an angled portion 72. The boundaries or edges, 70 and 71, of the angled portion 72 are particularly important in shaping the pressure distribution. Removal of the air bearing surface in encircled region 62 reduces the lift generated by the air bearing at low positive skew angle conditions. Encircled portion 63, added to rim rail 52 via the angular location of boundary line 71, remains at moderate pressure at low skew angle conditions. At low skew angle conditions, the flow is substantially from the front of the slider to the back, parallel to the rim edge 64 and the hub edge 66 of the slider 26.

However, under high positive skew angle conditions, such as may occur when the actuator arm assembly is used to position slider 26 at OD 111, the encircled region 63 is highly pressurized by the lubrication film flow. This pressurization in region 63 provides additional lift and counteracts the tendency for the slider to roll the rim rail 52 downward (negative roll) at high skew angles. Thus, the employment of angled portion 72 of rail 52 utilizes the concept of skew selective pressurization. The reduction of the roll variation is a major benefit of this invention.

Figure 4:
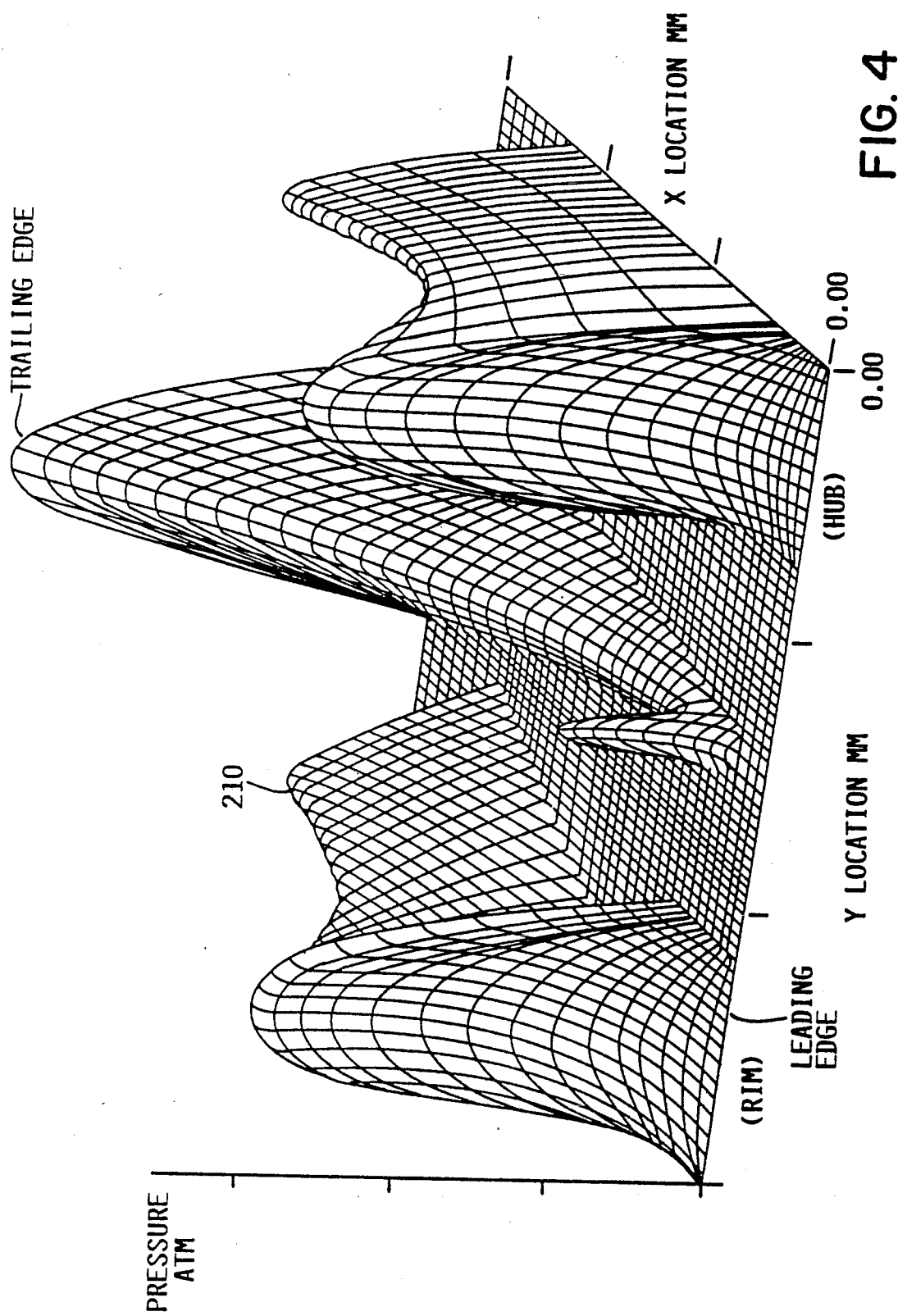
FIG. 4 is a plot of the pressure distribution, viewed from the slider's leading edge, that occurs when the slider shown in FIG. 3 is flying at low skew.

Shown in FIG. 4 is a leading edge 47 view of the pressure distribution of the gas lubrication film acting on slider air bearing surface 49 at low positive skew conditions. FIG. 3 is referred to in the preferred embodiment, low positive skew occurs at ID 110. The pressure build up from encircled region 63 of the angled portion 72 of the rim rail 52 is visible at 210. Note that rim rail 52 is wider than hub rail 51. Without the angled boundary 70 of rim rail 52, the slider would tend to fly at a high positive roll (rim roll upward) at low positive skew conditions. However, because rim rail 52 angles away from the rim edge 64 as shown by the angular boundary 70, the tendency toward positive roll at the ID position for the slider 26 is reduced.

Figure 5:
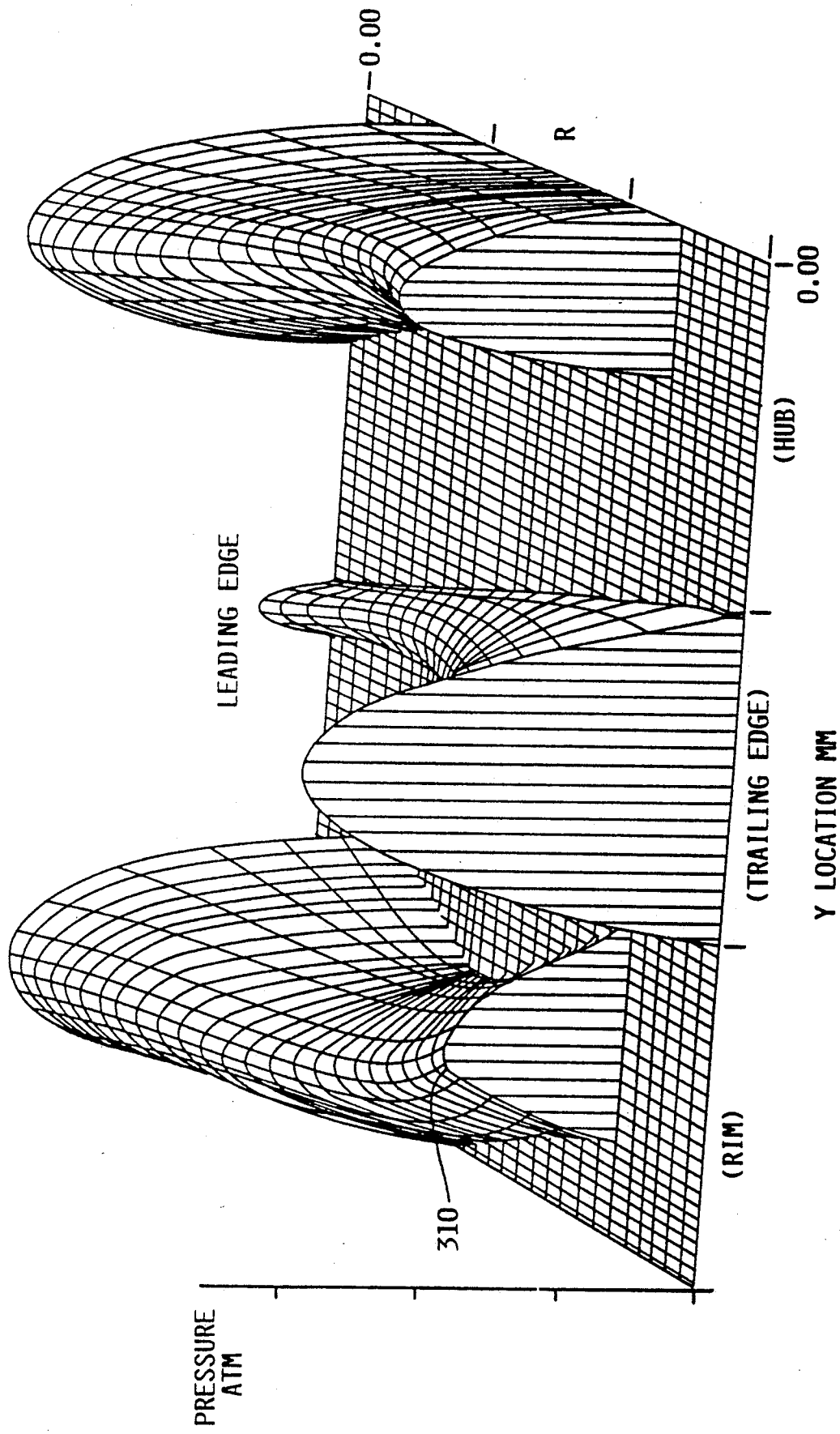
FIG. 5 is a plot of the pressure distribution, viewed from the slider's trailing edge, that occurs when the slider shown in FIG. 3 is flying at a low skew.

FIG. 5 presents the same pressure distribution plot as FIG. 4, but viewed from the trailing edge 48 of slider 26. The effect of angled boundary lines 70 and 71 of rim rail 52 can be seen at 310. Because of the low positive skew conditions, the pressure distribution of each rail is relatively uniform.

Figure 6:
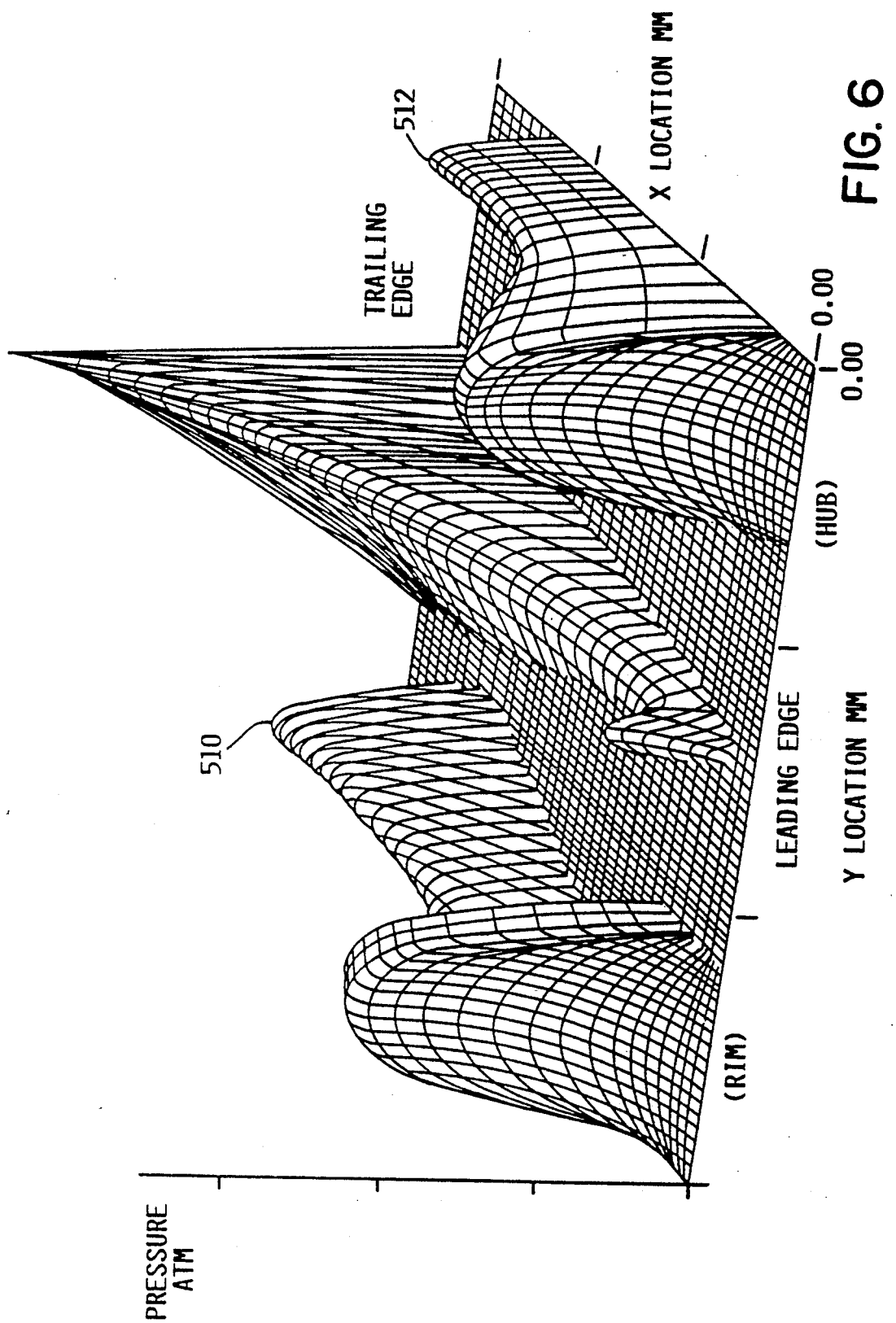
FIG. 6 is a plot of the pressure distribution, viewed from the slider's leading edge, that occurs when the slider shown in FIG. 3 is flying at high skew.

FIG. 6 presents a leading edge view of the pressure distribution of the gas lubrication film acting on slider air bearing surface 49 at high positive skew conditions where the air flow strikes the rim edge 64 of the slider 26. In the preferred embodiment, high positive skew occurs at OD 111. FIG. 6 shows a pressure distribution at a high skew angle while FIG. 4 shows a pressure distribution at a low skew angle. Both FIGS. 4 and 6 show the pressure distribution from the leading edge. Notice that in comparing FIG. 6 to FIG. 4, the pressure distribution on each rail has shifted towards the right because of the angular orientation of the air flow with respect to the longitudinal axis 60 of the slider 26. This shift in pressure, if uncompensated for, causes a negative roll of the slider at positive skew conditions, and results in a lower fly height and degraded operation of the slider. However, the placement of the angled rail portion 72 of the rim rail 52 with boundaries or edges 70 and 71 acts to compensate for the tendency toward negative roll. The angled portion 72 of rim rail 52 is now fully pressurized (depicted as region 510), to generate additional lift and prevent the undesirable roll. The rear portion of the hub rail 51 is also pressurized to a lesser as shown at region 512.

Figure 7:
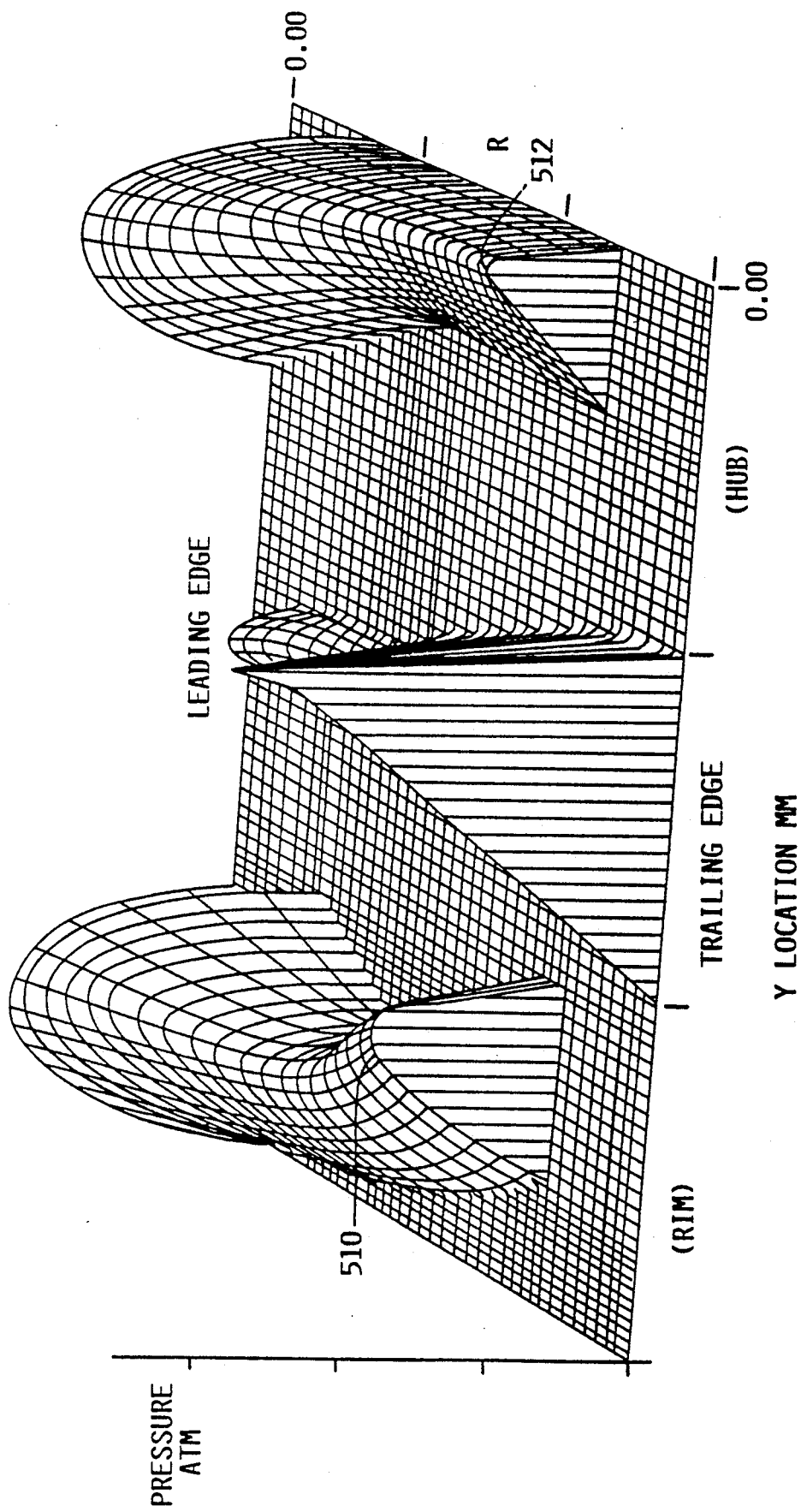
FIG. 7 is a plot of the pressure distribution, viewed from the slider's trailing edge, that occurs when the slider shown in FIG. 3 is flying at a high skew.

FIG. 7 presents the same pressure distribution plot as FIG. 6, but viewed from the trailing edge of slider 49. The rounded pressure distribution on the rim rails can clearly be seen at 510. The pressure distribution, though shifted in the high skew case, has been compensated for by the angular placement of rim rail 52, such that the pressure distribution, when integrated over the air bearing surface 49, generates the same lift force producing substantially the same flying height and compensating for the tendency to roll.

Figure 8:
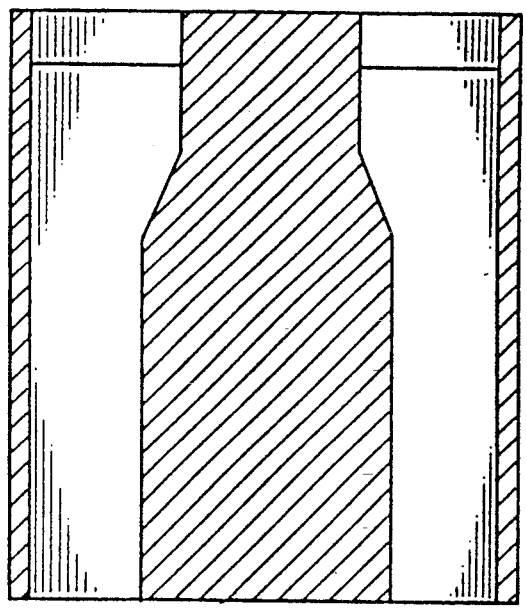
FIG. 8 is the air bearing surface of the symmetrical type rail slider. This slider was tested and the results are shown in FIGS. 10 and 11.
Figure 9:
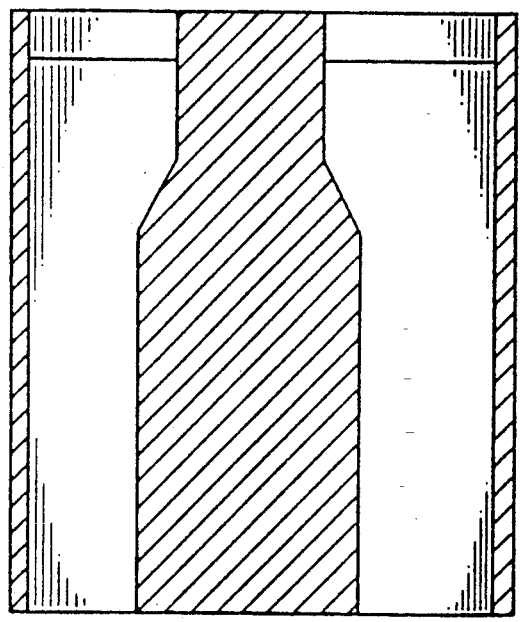
FIG. 9 is the air bearing surface of the non-symmetrical type rail slider in which one rail is wider than the other. This slider was tested and compared with other sliders. The results are shown in FIGS. 10 and 11.
Figure 10:
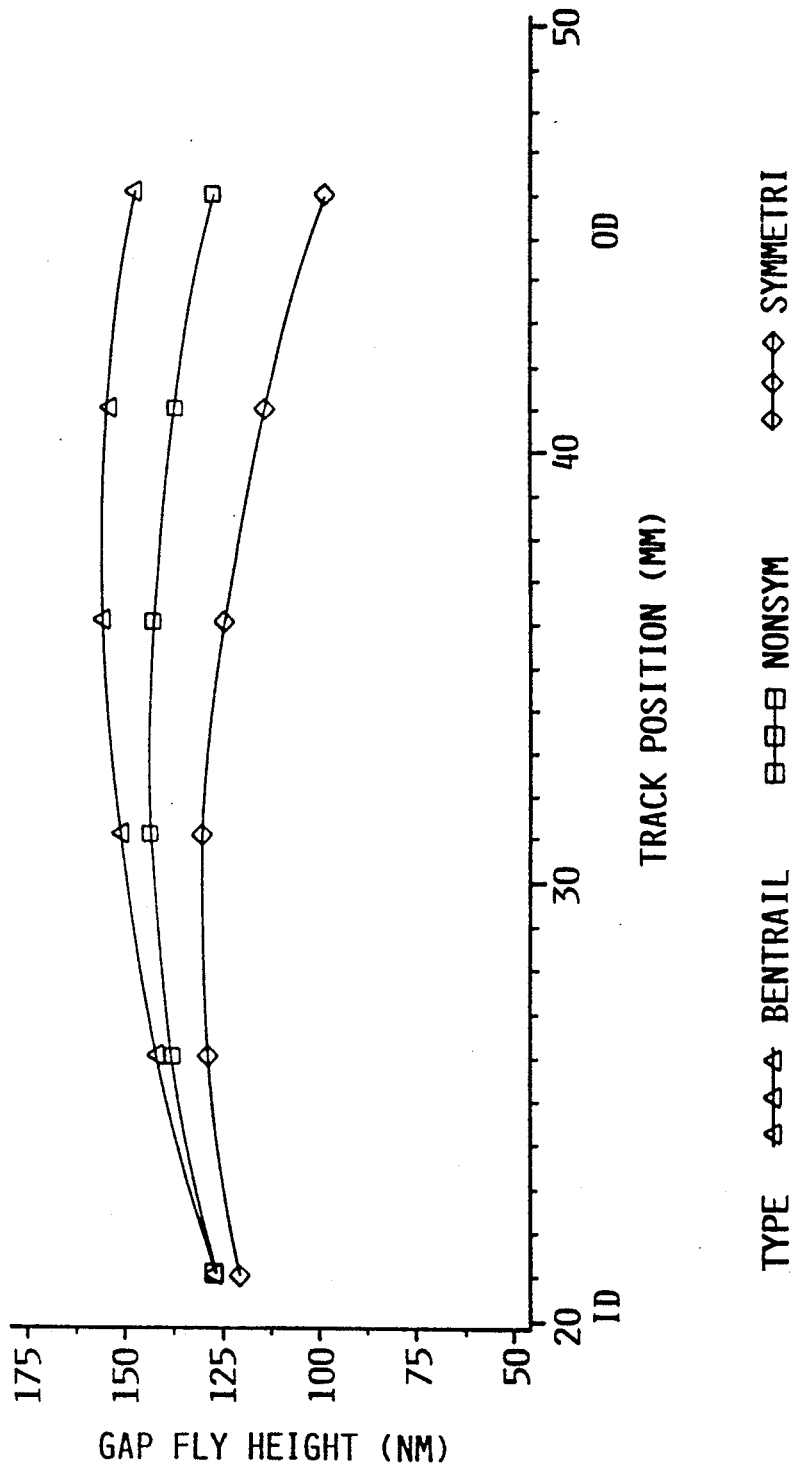
FIG. 10 is the plot of the fly height behavior that occurs with several ABS configurations from the ID to the OD track.
Figure 11:
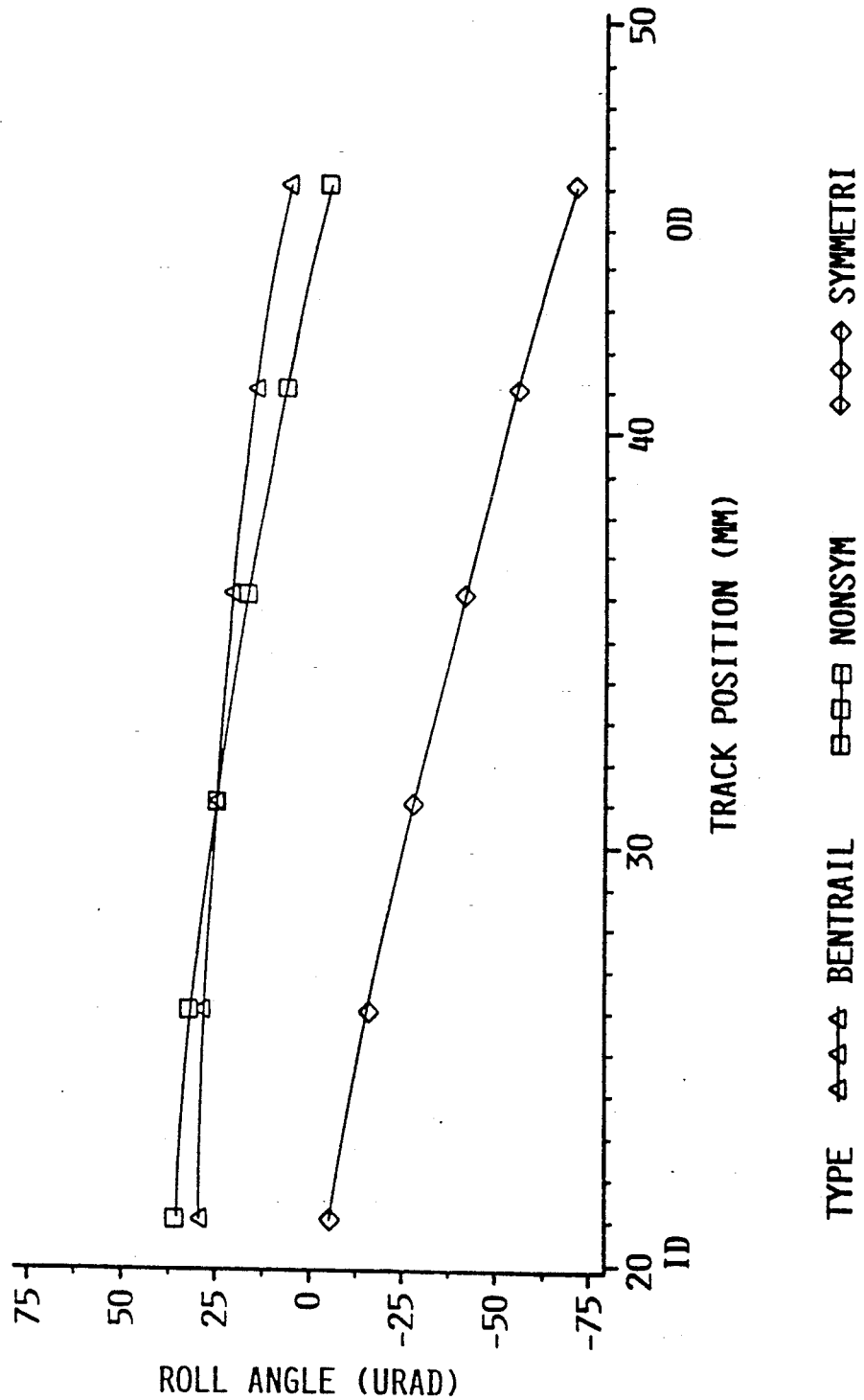
FIG. 11 is the plot of the roll angle behavior that occurs with several ABS configurations from the ID to the OD track.

FIGS. 8 and 9 show air bearing surfaces of two types of sliders which were tested along with the preferred embodiment and compared in FIGS. 10 and 11. FIG. 8 shows a slider with symmetrical rails. FIG. 9 shows a slider having one rail wider than the other or a nonsymmetrical rail.

FIG. 10 presents a graph of the recording transducer fly height versus track position for three separate air bearing surface (ABS) configurations on a slider:

SYMMETRI: the symmetrical rail configuration of FIG. 8;

NONSYM: the nonsymmetrical rail configuration of FIG. 9; and

BENTRAIL: the nonsymmetrical, bent-rail configuration of FIG. 3.

The symmetrical rail configuration (as shown by SYMMETRI in FIG. 10) yields an unacceptable fly height profile with the fly height at OD 111 (at high positive skew) much lower than fly height at ID 110. A low fly height at OD is detrimental because the velocity of the disk is higher at OD, which increases the likelihood of mechanical contact between the disk surface and a low flying slider.

The nonsymmetrical rail configuration (as shown by NONSYM in FIG. 10) yields a better fly height profile with the fly height at OD 111 being about the same as fly height at ID 110. Also, the fly height between ID 110 and OD 111 is more uniform than the fly height of the symmetrical ABS (SYMMETRI).

The nonsymmetrical, bent-rail configuration (as shown by BENTRAIL in FIG. 10) yields the best ID to OD fly height profile. The fly height at ID 110 is substantially the same as the other configurations, the fly height is relatively uniform across all track positions, and the fly height is slightly increased at OD 111. An increased fly height at OD 111 is advantageous because it is always dangerous to fly low because of the likelihood of contact between the head and the disk surface 34. It is especially dangerous to fly low at OD 111 because of the higher linear velocity between the disk and the slider at the outer diameter. The advantage to a low flying height is in the increased signal amplitude. Where the linear density of the disk is lower at the OD than at the ID of the disk, it is advantageous to have a slightly increased flying height at OD 111 since a low flying height at OD 111 is dangerous and provides no advantage from a data density standpoint. Of course, if linear data density was equal or higher at the OD, on balance it may be advantageous to fly as low at the OD as at the ID. The ABS could be designed to accommodate this. Skewing the rails in parallel on the ABS controls the flyheight variation for a given geometry. Angling one rail or the other controls the roll versus the skew angle. By angling a rail the point where the pressure falls off versus skew angle is controlled.

FIG. 11 illustrates the corresponding roll behavior of the same three ABS configurations.

The symmetrical configuration (SYMMETRI) results in a high negative and undesirable roll at OD 111 due to the pressure shift under the rails associated with skewed conditions. When the slider 26 has a negative roll, the rim rail 52 tilts toward the disk surface 34. This reduces the flying height and increases the likelihood of contact between the head and disk surface 34. Furthermore, at large skew angles, high negative roll results in a loss in fly height of the entire slider. Thus it is undesirable to employ a design with a high nominal roll at high skew conditions.

The nonsymmetrical rail configuration (NONSYM) substantially improves this behavior by increasing fly height at OD 111 and by moving the roll to a higher nominal distribution. However, the high positive roll introduced at ID 110 is still undesirable since the minimum fly height is reduced by any roll condition. In addition, a high roll at ID 110 causes a portion of the ABS to be in physical contact with the disk surface for an extended period of time when the disk surface initially begins to rotate, thus degrading the reliability of the disk drive.

The BENTRAIL ABS configuration provides the best slider fly height profile from ID 110 to OD 111. This is a primary advantage of skew selective pressurization employed by this invention. The roll at ID 110 is less than for the NONSYM configuration. Thus the bent rail allows the minimum fly height to occur at ID 110 without as much undesirable roll as in the NON- SYM ABS configuration. By placing a portion of the rail at different angles, the pressure provided by that rail can be modified to select the ID and OD fly height and roll independently of each other. This is especially important in a disk drive where the slider has a low fly height.

FIG. 12 presents a second embodiment of a skew selective pressurization design. The ABS of FIG. 12 is tailored to a disk drive that places the rotary actuator pivot location in a position that leaves the slider at a non-optimum angle under normal operating conditions. This embodiment uses a modification to the ABS rather than placing the read and write head at an angle on the slider. Placing the read and write head at an angle is undesirable because it requires tooling changes to the process used to build heads and makes wiring connections to the sliders more complicated.

FIG. 13 illustrates a third and more complex embodiment of a design using skew selective pressurization. The concept of skew selective pressurization does not depend upon the use of straight rail edges as shown by boundaries 70 and 71 in FIG. 3 but can also be implemented using a design with curved edges. The embodiment of FIG. 13 shows a curved boundary 700 for angled portion 72 of the rim rail 52'. Because of the net angular placement with respect to a longitudinal axis of the slider shown of the curved or angled portion 72' of the rim rail 52', skew selective pressurization results.

FIG. 14 presents a final embodiment of an air bearing surface (ABS) employing skew selective pressurization. The hub rail 51" is shown parallel to a longitudinal axis 60" of the slider 26" and the rim rail 52" is shown angled with respect to the longitudinal axis 60". Since the rails are nonparallel and because the rim rail 52" can be made to align with the flow at a different skew angle than the hub rail 51", this design employs skew selective pressurization. Although this straight rail design does not have all the advantages of the preferred embodiment, it may be more amenable to conventional machining practices.

The presented ABS configurations may be built by molding, etching, laser ablation, ion milling, conventional machining processes, or by a variety of other means.

Several disadvantages of the slider air bearing surface with symmetrical rails of FIG. 8 are overcome by the nonsymmetrical rails of the sliders in FIGS. 3, 12, 13, and 14. The nonsymmetrical sliders have no stepped or convex portions that require extra machining processes, or which introduce lift sensitivities, or which accumulate debris. A further advantage of sliders with nonsymmetrical rails is skew selective pressurization across all skew angles from ID to OD, which provides a substantially uniform flying height and roll with a slight increase in flying height at OD, where flying low is most dangerous.

The present invention and the best modes of practicing it have been described. The foregoing description is illustrative only, so other means and techniques could be employed without departing from the full scope of the invention as described in the appended claims.

We claim:

1. An air bearing slider for supporting a recording transducer in relation to a moving recording medium, comprising:
    a support structure having side edges, leading and trailing edges, wherein said leading and trailing edges are relative to the motion of said medium, and a longitudinal axis disposed along the length of said support structure from said leading edge to said trailing edge, said longitudinal axis being at a skew angle ranging from zero to positive and negative values with respect to the direction of motion of said recording medium at said support structure;
    a pair of side rails disposed along said side edges of said support structure facing said medium;
    said side rails being substantially nonidentical and nonsymmetrical about said longitudinal axis, for providing air pressurization when said skew angle is from zero to large negative or positive values whereby said slider flies at a close and substantially uniform spacing from said moving recording medium; and
    a center rail positioned between said pair of side rails, wherein at least a portion of said center rail is angled with respect to said longitudinal axis.

2. The air bearing slider of claim 1 wherein a portion of one of said side rails near said trailing edge is angled with respect to said longitudinal axis.

3. The air bearing slider of claim 1 wherein one of said side rails is angled with respect to said longitudinal axis.

4. The air bearing slider of claim 1 wherein a portion of one of said side rails near said trailing edge is curved with respect to said longitudinal axis.

5. The air bearing slider of claim 1 wherein one of said side rails is curved with respect to said longitudinal axis.

6. The air bearing slider of claim 1 wherein a portion of one of said side rails near said trailing edge is angled toward said longitudinal axis and a portion of other said side rail near said leading edge is angled toward said longitudinal axis.

7. The air bearing slider of claim 1 wherein one of said side rails is angled with respect to said longitudinal axis and the other of said side rails is angled with respect to said longitudinal axis.

8. A disk drive recording system, comprising:
    at least one disk surface mounted for rotation about an axis;
    at least one actuator arm mounted for movement in a radial direction across said disk surface;
    at least one slider mounted on said actuator arm, having a side edge, leading edge and trailing edge, and a longitudinal axis disposed along the length of said slider from said leading edge to said trailing edge, said longitudinal axis being at a skew angle ranging from zero to positive and negative values with respect to the direction of motion of said disk surface at said slider, including:
    a pair of side rails disposed along said side edges of said slider facing said disk surface;
    said side rails being substantially nonidentical and nonsymmetrical about said longitudinal axis, for providing air pressurization when said skew angle is from zero to large negative or positive values whereby said slider flies at a close and substantially uniform spacing from said moving disk surface; and
    a third rail positioned between said pair of said rails, said third rail having angled portions with respect to said longitudinal axis.

9. The disk recording system of claim 8, wherein the third rail is nonsymmetrical with respect to said longitudinal axis.

10. The disk recording system of claim 8 wherein one of said side rails is angled with respect to said longitudinal axis.

11. The disk recording system of claim 10 wherein a portion of one of said side rails is angled with respect to the longitudinal axis near the trailing edge.

12. The disk recording system of claim 10 wherein a portion of one of said side rails is angled with respect to the longitudinal axis near the leading edge.

13. The disk recording system of claim 10 wherein the angle of one of the side rails is selected to be at a low skew angle when the transducer is positioned over the landing zone so as to reduce the take off velocity of the slider.

14. The disk recording system of claim 8 wherein one of said side rails is curved with respect to the said longitudinal axis.

15. The disk recording system of claim 14 wherein a portion of one of said side rails is curved toward the longitudinal axis near the trailing edge.

16. The disk recording system of claim 14 wherein a portion of one of said side rails is curved toward the longitudinal axis near the leading edge.

17. The disk recording system of claim 8 wherein a portion of one of said side rails near said trailing edge is bent toward said longitudinal axis and a portion of other said side rail near said leading edge is bent toward said longitudinal axis.

18. An apparatus for recording data on a rotating magnetic media comprising:
a housing, said rotating magnetic memory rotatably attached to said housing;
an actuator arm assembly rotatably attached to said housing;
a slider attached to said actuator arm assembly such that said slider can be selectively positioned over the surface of said rotating magnetic memory, said slider having a longitudinal axis, a hub edge and a rim edge, both of said hub edge and said rim edge parallel to said longitudinal axis, said slider including an air bearing surface, said air bearing surface further comprising:
a first rail which is substantially parallel to the longitudinal axis of the slider;
a second rail further including:
a parallel portion which is substantially parallel to the longitudinal axis of the slider;
an angled portion having an axis which forms an angle with the longitudinal axis of the slider;
wherein said second rail is proximate the rim edge.

19. The apparatus for recording data of claim 18, wherein slider has a leading edge and a trailing edge relative to the motion of said rotating magnetic memory, and wherein said angled portion of said second rail is proximate said trailing edge.

20. The apparatus for recording data of claim 18, further comprising a center rail disposed between said first and second rails.

21. An air bearing slider for supporting a recording transducer in relation to a rotating magnetic recording medium, comprising:
a support structure having a longitudinal axis, a hub edge and a rim edge, both of said hub edge and said rim edge parallel to said longitudinal axis, said support structure including an air bearing surface, said air bearing surface further comprising:
a first rail which is substantially parallel to the longitudinal axis of the slider;
a second rail further including:
a parallel portion which is substantially parallel to the longitudinal axis of the slider;
an angled portion having an axis which forms an angle with the longitudinal axis of the slider;
wherein said second rail is proximate the rim edge.

22. The air bearing slider claim 21, wherein said slider has a leading edge and a trailing edge relative to the motion of said rotating magnetic memory, and wherein said angled portion of said second rail is proximate said trailing edge.

23. The air bearing slider of claim 21, further comprising a center rail disposed between said first and second rails.

24. An air bearing slider for supporting a recording transducer in relation to a moving recording medium, comprising:
a support structure having first and second side edges, leading and trailing edges, wherein said leading and trailing edges are relative to the motion of said medium, and a longitudinal axis disposed along the length of said support structure from said leading edge to said trailing edge;
a first side rail disposed along said first side edge and facing said medium, said first side rail being substantially parallel to the longitudinal axis of the slider; and
a second side rail disposed along said second side edge and facing said medium, wherein at least a portion of said second side rail has an axis which forms an angle with the longitudinal axis of the slider.

25. The air bearing slider of claim 24, wherein said first side edge is positioned facing a hub of a rotating magnetic disk recording medium, and said second side edge is positioned facing a rim of said rotating magnetic disk recording medium.

26. The air bearing slider of claim 24, wherein said second side rail is a substantially straight rail along its entire length.

27. The air bearing slider of claim 24, wherein said second side rail comprises a parallel portion which is substantially parallel to the longitudinal axis of the slider, and an angled portion which forms said angle with the longitudinal axis of the slider.

28. The air bearing slider of claim 27, wherein said angled portion is proximate said trailing edge.

29. A disk drive apparatus for recording data, comprising:
at least one rotating disk medium for recording data;
a housing, said rotatable disk medium being rotatably attached to said housing; an actuator arm assembly rotatably attached to said housing;
a slider attached to said actuator arm assembly such that said slider can be selectively positioned over the surface of said rotating disk medium, said slider having a longitudinal axis, and first and second edges, both of said edges parallel to said longitudinal axis, said slider including an air bearing surface, said air bearing surface further comprising:
a first side rail disposed along said first side edge and facing said medium, said first side rail being substantially parallel to the longitudinal axis of the slider; and
a second side rail disposed along said second side edge and facing said medium, wherein at least a portion of said second side rail has an axis which forms an angle with the longitudinal axis of the slider.

30. The disk drive apparatus of claim 29, wherein said first side edge is positioned facing a hub of a rotating magnetic disk recording medium, and said second side edge is positioned facing a rim of said rotating magnetic disk recording medium.

31. The disk drive apparatus of claim 29, wherein said second side rail is a substantially straight rail along its entire length.

32. The disk drive apparatus of claim 29, wherein said second side rail comprises a parallel portion which is substantially parallel to the longitudinal axis of the slider, and an angled portion which forms said angle with the longitudinal axis of the slider.

33. The disk drive apparatus of claim 32, wherein said angled portion is proximate said trailing edge.

34. An air bearing slider for supporting a recording transducer in relation to a rotating disk recording medium, comprising:
   a support structure having first and second side edges, and leading and trailing edges, wherein said leading and trailing edges are relative to the motion of said medium, said support structure also having a longitudinal axis disposed along the length of said support structure from said leading edge to said trailing edge;
   a first side rail disposed along said first side edge and facing said medium, said first rail having a leading edge and a trailing edge relative to the motion of said medium; and
   a second side rail disposed along said second side edge and facing said medium, said second side rail having a leading edge and a trailing edge relative to the motion of said medium, wherein said second side rail is substantially nonidentical and nonsymmetrical about said longitudinal axis to said first side rail, wherein the trailing edge of said second rail is closer to said longitudinal axis than the trailing edge of said first rail.

35. The air bearing slider of claim 34, wherein a portion of said second side rail near said trailing edge is angled toward said longitudinal axis and a portion of said first side rail near said leading edge is angled toward said longitudinal axis.

36. The air bearing slider of claim 34, wherein said first side edge faces a hub of said rotating disk and said second side edge faces a rim of said rotating disk.

37. The air bearing slider of claim 34, wherein a portion of said second side rail near said trailing edge is curved toward said longitudinal axis.

38. A disk drive apparatus for recording data, comprising:
   at least one rotating disk medium for recording data;
   a housing, said rotatable disk medium being rotatably attached to said housing;
   an actuator arm assembly rotatably attached to said housing;
   a slider attached to said actuator arm assembly such that said slider can be selectively positioned over the surface of said rotating disk medium, said slider having a longitudinal axis, leading and trailing edges relative to the motion of said rotating disk medium, and first and second side edges, said slider including an air bearing surface, said air bearing surface further comprising:
   a first side rail disposed along said first side edge and facing said rotating disk medium, said first rail having a leading edge and a trailing edge relative to the motion of said medium; and
   a second side rail disposed along said second side edge and facing said rotating disk medium, said second side rail having a leading edge and a trailing edge relative to the motion of said medium, wherein said second side rail is substantially nonidentical and nonsymmetrical about said longitudinal axis to said first side rail, wherein the trailing edge of said second rail is closer to said longitudinal axis than the trailing edge of said first rail.

39. The disk drive apparatus of claim 38, wherein a portion of said second side rail near said trailing edge is angled toward said longitudinal axis and a portion of said first side rail near said leading edge is angled toward said longitudinal axis.

40. The disk drive apparatus of claim 38, wherein said first side edge faces a hub of said rotating disk and said second side edge faces a rim of said rotating disk.

41. The disk drive apparatus of claim 38, wherein a portion of said second side rail near said trailing edge is curved toward said longitudinal axis.

* * * * *